United States Patent
Park et al.

(10) Patent No.: US 9,490,989 B2
(45) Date of Patent: Nov. 8, 2016

(54) APPARATUS AND METHOD FOR PREVENTING COMMAND CONFLICTS IN A SMART GRID NETWORK

(71) Applicant: Samsung Electronics Co., Ltd., Gyeonggi-do (KR)

(72) Inventors: Ho-Yeon Park, Seoul (KR); Se-Hee Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 347 days.

(21) Appl. No.: 13/645,849

(22) Filed: Oct. 5, 2012

(65) Prior Publication Data

US 2013/0090773 A1    Apr. 11, 2013

(30) Foreign Application Priority Data

Oct. 6, 2011 (KR) .................. 10-2011-0102111

(51) Int. Cl.
*H04L 12/12* (2006.01)
*H04L 12/28* (2006.01)
(Continued)

(52) U.S. Cl.
CPC ........... *H04L 12/12* (2013.01); *H04L 12/2818* (2013.01); *H04L 12/2821* (2013.01);
(Continued)

(58) Field of Classification Search
CPC ........... H04L 12/2803; H04L 12/2816; H04L 12/2818; Y04S 20/222; Y04S 20/242; Y04S 20/32; H02J 3/14; H02J 9/005; H02J 13/0075; H02J 2003/143; Y02B 70/3225; Y02B 70/3233; Y02B 70/3266; Y02B 90/241; G08C 17/02; G08C 2201/42; G08C 2201/50; G08C 2201/93; G05B 2219/2642; G01D 4/002; G06Q 50/06

USPC ............. 700/65, 66, 286, 295, 297; 702/57, 702/60–62; 455/403, 418–420; 340/870.01, 340/870.02
See application file for complete search history.

(56) References Cited

U.S. PATENT DOCUMENTS 6,393,297 B1 * 5/2002 Song ............................ 455/466
7,953,032 B2 * 5/2011 Liang ................ H04W 52/0229
370/311

(Continued)

OTHER PUBLICATIONS

ZigBee Alliance and HomePlug Powerline Alliance Liaison, "Smart Energy Profile 2.0 Technical Requirements Document", ZigBee-105553, Apr. 24, 2010.

(Continued)

*Primary Examiner* — Crystal J Barnes-Bullock
(74) *Attorney, Agent, or Firm* — The Farrell Law Firm, P.C.

(57) ABSTRACT

A method for managing in an Energy Management System (EMS) includes receiving, from a mobile terminal, a user command for at least one target smart appliance controlled by the EMS, determining, upon receiving the user command, determining whether the at least one target smart appliance includes at least one power-controlled smart appliance, wherein each power-controlled smart appliance operates in a power control mode, generating, upon a determination that there is at least one power-controlled target smart appliance, a notice message for informing the mobile terminal that the at least one power-controlled target smart appliance operates in the power control mode, and sending the notice message to the mobile terminal, and determining, upon receiving a response message to the sent notice message, whether to continue the power control mode of the at least one power-controlled smart appliance according to selection information included in the response message.

25 Claims, 8 Drawing Sheets

(51) Int. Cl.
*H02J 3/14* (2006.01)
*H02J 13/00* (2006.01)
*F24F 11/00* (2006.01)

(52) U.S. Cl.
CPC ........... *F24F2011/0075* (2013.01); *H02J 3/14* (2013.01); *H02J 13/0079* (2013.01); *H02J 2003/143* (2013.01); *Y02B 60/34* (2013.01); *Y02B 70/325* (2013.01); *Y02B 70/3266* (2013.01); *Y02B 70/3275* (2013.01); *Y04S 20/228* (2013.01); *Y04S 20/242* (2013.01); *Y04S 20/244* (2013.01)

(56) References Cited

U.S. PATENT DOCUMENTS

| | | | | |
|---|---|---|---|---|
| 8,095,233 | B1* | 1/2012 | Shankar | H02J 3/14 419/69 |
| 8,412,387 | B2* | 4/2013 | Park et al. | 700/297 |
| 8,560,133 | B2* | 10/2013 | Venkatakrishnan | G06Q 50/06 700/275 |
| 8,718,798 | B2* | 5/2014 | Bultman | G01D 4/002 700/22 |
| 2003/0018703 | A1 | 1/2003 | Huitema et al. | |
| 2003/0100962 | A1* | 5/2003 | Sumita et al. | 700/65 |
| 2003/0105854 | A1 | 6/2003 | Thorsteinsson et al. | |
| 2007/0240173 | A1 | 10/2007 | McCoy et al. | |
| 2008/0062977 | A1* | 3/2008 | Kaneko et al. | 370/389 |
| 2010/0187219 | A1 | 7/2010 | Besore et al. | |
| 2011/0046799 | A1 | 2/2011 | Imes et al. | |
| 2011/0047370 | A1 | 2/2011 | Nagel et al. | |
| 2011/0057518 | A1* | 3/2011 | Gilbert | G06F 1/266 307/112 |
| 2011/0184585 | A1 | 7/2011 | Matsuda et al. | |
| 2011/0196547 | A1 | 8/2011 | Park et al. | |
| 2012/0043821 | A1* | 2/2012 | Lee et al. | 307/80 |
| 2012/0059528 | A1* | 3/2012 | Umesawa et al. | 700/295 |
| 2012/0116597 | A1* | 5/2012 | Bultman | G01D 4/002 700/286 |
| 2013/0185079 | A1* | 7/2013 | Park et al. | 704/275 |
| 2014/0277591 | A1* | 9/2014 | Sasai et al. | 700/3 |

OTHER PUBLICATIONS

European Search Report dated Apr. 17, 2015 issued in counterpart application No. 12838508.5-1853.

* cited by examiner

| SMART APPLIANCE ID | NAME OF SMART APPLIANCE | APPLICATION OF CURRENT DRLC |
|---|---|---|
| 1231-4f3-22d-33d | WASHER | TRUE |
| Vf33-12fdw-231 | REFRIGERATOR | FALSE |
| Fv33r3-2334el-df33 | AIR CONDITIONER | TRUE |
| G5g-23r3-defe | HEATER | TRUE |
| ⋮ | ⋮ | ⋮ |

APPARATUS AND METHOD FOR PREVENTING COMMAND CONFLICTS IN A SMART GRID NETWORK

PRIORITY

This application claims priority under 35 U.S.C. §119(a) to a Korean Patent Application filed in the Korean Intellectual Property Office on Oct. 6, 2011 and assigned Serial No. 10-2011-0102111, the entire content of which is incorporated herein by reference.

BACKGROUND OF THE INVENTION

1. Field of the Invention

The present invention relates generally to a smart grid network, and more particularly, to an apparatus and method for preventing command conflicts in a smart grid network.

2. Description of the Related Art

Smart grid technology has been provided, by a convergence of smart appliances and the electric power industry, in order to build high-efficiency intelligent power networks. The smart grid technologies may include, for example, real-time monitoring, demand response, management of a smart grid network such as a communication network, power management for user-end devices such as smart appliances, etc.

FIG. 1 illustrates a configuration of a general smart grid network.

Referring to FIG. 1, in the general smart grid network, home smart appliances 130, 140, 150 and 160 are managed depending on commands for smart grid management from a utility operator 110. These commands for smart grid management may include a Demand Response/Load Control (DRLC) command. Such a DRLC command 10 is delivered to an Energy Management System (EMS) 100, and the EMS 100 analyzes the DRLC command 10 and delivers DRLC commands 20 to the smart appliances 130, 140, 150 and 160 connected thereto.

Although the home smart appliances 130, 140, 150 and 160 may be driven by DRLC commands, these home smart appliances may also be driven according to a command 30 received from a user. The mobile terminal 120 transmits the user command 30 to the EMS 100 and receives a resulting message 40 sent from the EMS 100. The user may drive specific or multiple smart appliances 130, 140, 150 and 160 by delivering the user command 30 to the EMS 100 using his mobile terminal 120.

FIG. 2 illustrates reception of a user command during operation of a conventional DRLC command-based smart appliance.

Referring to FIG. 2, in the smart grid network, a home smart appliance performs a DRLC command-based operation 220 from a start 200 of the DRLC command till an end 210 of the DRLC command. In this way, the smart appliance operates according to the DRLC command in order to optimize energy efficiency. Conventionally, however, upon receiving a user command 230 during the operation 220, the smart appliance may continue to execute the DRLC command while ignoring the user command 230, or may not execute the user command 230 until after stopping the DRLC command-based operation 220.

FIG. 3 illustrates reception of a DRLC command during operation of a conventional user command-based smart appliance.

Referring to FIG. 3, in a manner similar to that described with respect to FIG. 2, upon receiving a DRLC command 330 during a user command-based operation 320 from a start 300 of the user command until an end 310 of the user command, the smart appliance may continue to execute the user command while ignoring the DRLC command 330, or may not execute the DRLC command 330 until after stopping the user command-based operation 320.

As described above, in a conventional smart grid network, if a home smart appliance continues to execute a DRLC command even though the home appliance receives a user command, the user may not be able to control the smart appliance according to the user's intentions.

However, as an alternative, if the smart appliances execute a user command received during the DRLC command-based operation, while ignoring the DRLC command, then the utility operator may not optimize the energy efficiency. Further, according to such an operation scheme, the utility operator may not detect that the DRLC command has been ignored.

Therefore, there is a demand for a method for, upon occurrence of a conflict between a DRLC command and a user command, informing the user and the utility operator of the conflict and mediating between these commands.

SUMMARY OF THE INVENTION

An aspect of embodiments of the present invention is to provide an apparatus and method for preventing a conflict between a smart-grid management command and a user command in a smart grid network.

Another aspect of embodiments of the present invention is to provide an apparatus and method capable of mediating between a smart-grid management command and a user command and informing a user of the mediation in a smart grid network.

According to one aspect of the present invention, a method for managing commands in an energy management system managing multiple smart appliances is provided. The method includes receiving, from a mobile terminal, a user command for at least one target smart appliance from among smart appliances controlled by the EMS, determining, upon receiving the user command, determining whether the at least one target smart appliance includes at least one power-controlled smart appliance, wherein each power-controlled smart appliance operates in a power control mode, generating, upon a determination that there is at least one power-controlled target smart appliance, a notice message for informing the mobile terminal that the at least one power-controlled target smart appliance operates in the power control mode, and sending the notice message to the mobile terminal, and determining, upon receiving a response message to the sent notice message, whether to continue the power control mode of the at least one power-controlled smart appliance according to selection information included in the response message.

According to another aspect of the present invention, there an Energy Management System for managing smart appliances is provided. The system includes a receiver for receiving, from a mobile terminal, a user command for at least one target smart appliance among the smart appliances managed by the EMS, a generator for, upon receiving the user command, determining whether the at least one target smart appliance includes at least one power-controlled smart appliance, such that the at least one power-controlled smart appliance operates in a power control mode, and upon a determination that the at least one target smart appliance includes at least one power-controlled smart appliance, generating a notice message for informing the mobile terminal of the at least one power-controlled smart appliance, and a smart appliance manager for, upon receiving a response message to the sent notice message, determining whether to continue the power control mode of the at least one power-controlled smart appliance according to selection information included in the response message.

BRIEF DESCRIPTION OF THE DRAWINGS

The above and other aspects, features and advantages of certain embodiments of the present invention will be more apparent from the following description taken in conjunction with the accompanying drawings, in which.

DETAILED DESCRIPTION OF EMBODIMENTS OF THE PRESENT INVENTION

Figure 1:
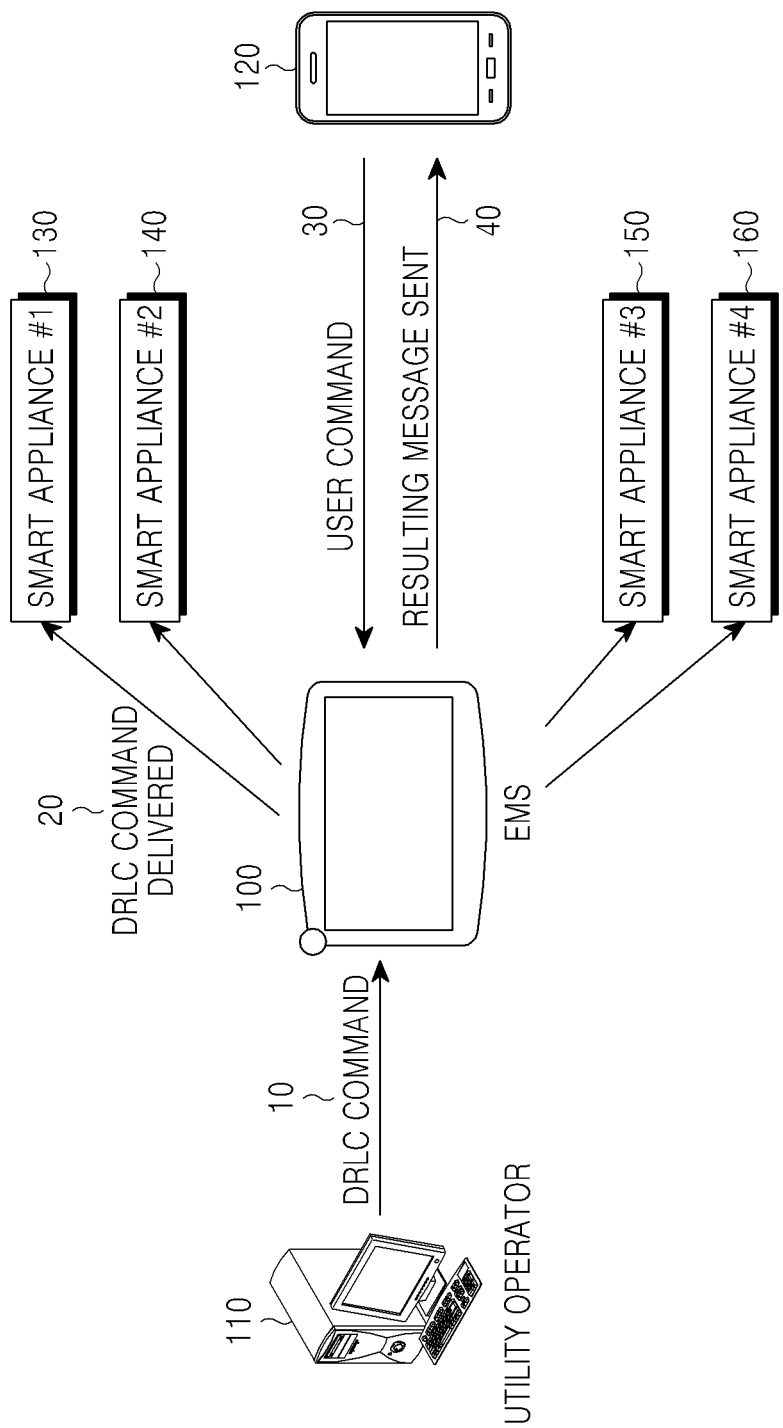
FIG. 1 is a diagram illustrating a configuration of a general smart grid network.
Figure 2:
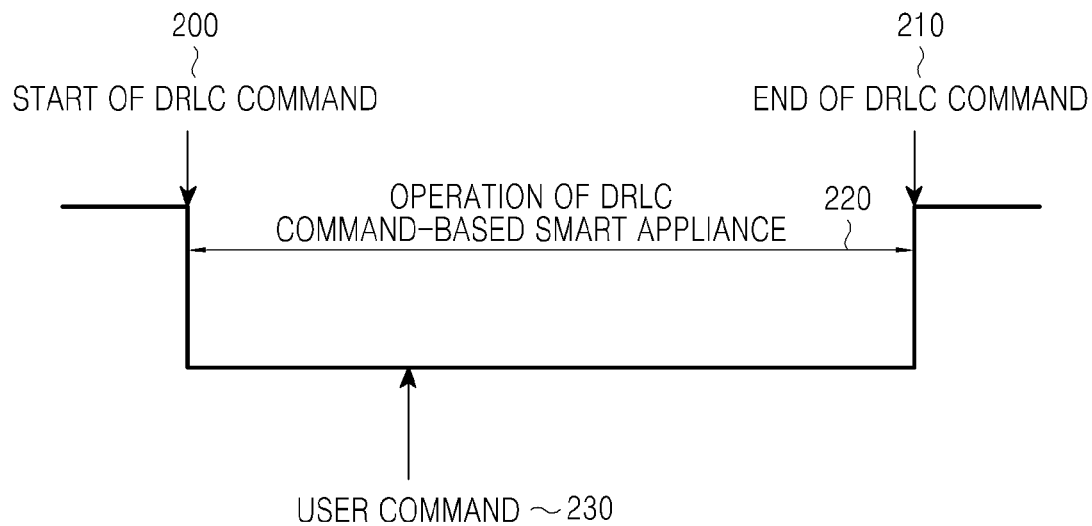
FIG. 2 is a diagram illustrating reception of a user command during operation of a conventional DRLC command-based smart appliance.
Figure 3:
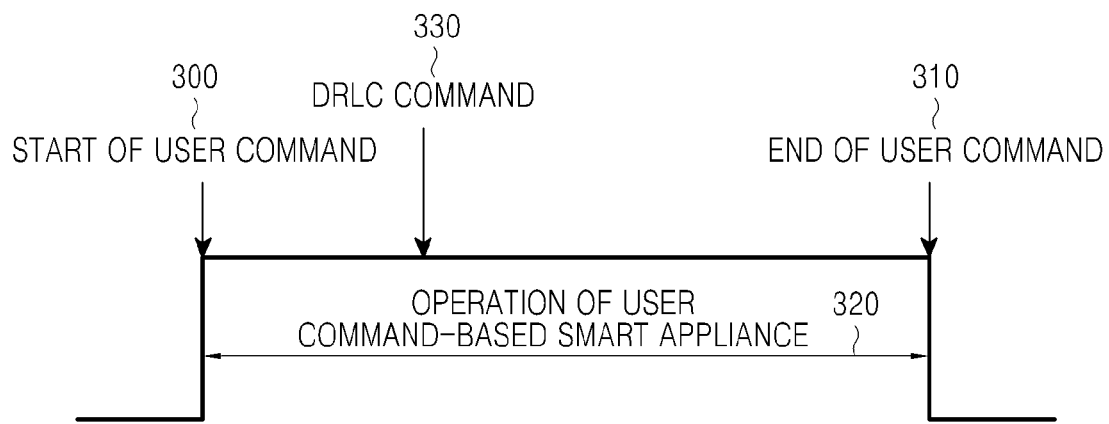
FIG. 3 is a diagram illustrating reception of a DRLC command during operation of a conventional user command-based smart appliance.

Embodiments of the present invention will now be described in detail with reference to the accompanying drawings. Throughout the drawings, the same drawing reference numerals will be understood to refer to the same elements, features and structures. In the following description, specific details such as detailed configuration and components are merely provided to assist the overall understanding of embodiments of the present invention. Therefore, it should be apparent to those skilled in the art that various changes and modifications of the embodiments described herein can be made without departing from the scope and spirit of the invention. In addition, descriptions of well-known functions and constructions may be omitted for clarity and conciseness.

Embodiments of the present invention provide a method for preventing a conflict between a smart-grid management command and a user command in a smart grid network. To this end, upon receiving a command for at least one target smart appliance from among multiple smart appliances, an EMS according to an embodiment of the present invention, which manages the smart appliances, determines whether the at least one target smart appliance is operating according to a previously received command. If at least one target smart appliance is operating according to a previously received command, the EMS generates a notice message including the current operating status and a proposed compromise if the target smart appliance is operating depending on the previously received command, and sends the notice message to a mobile terminal. Upon receiving a response to the notice message, the EMS determines whether to continue the operation based on selection information included in the response. In accordance with embodiments of the present invention, the EMS may inform the user of the conflict between the current commands, thereby enabling the user to make a selection corresponding to the current situation based on the compromise proposed by the EMS.

Figure 4:
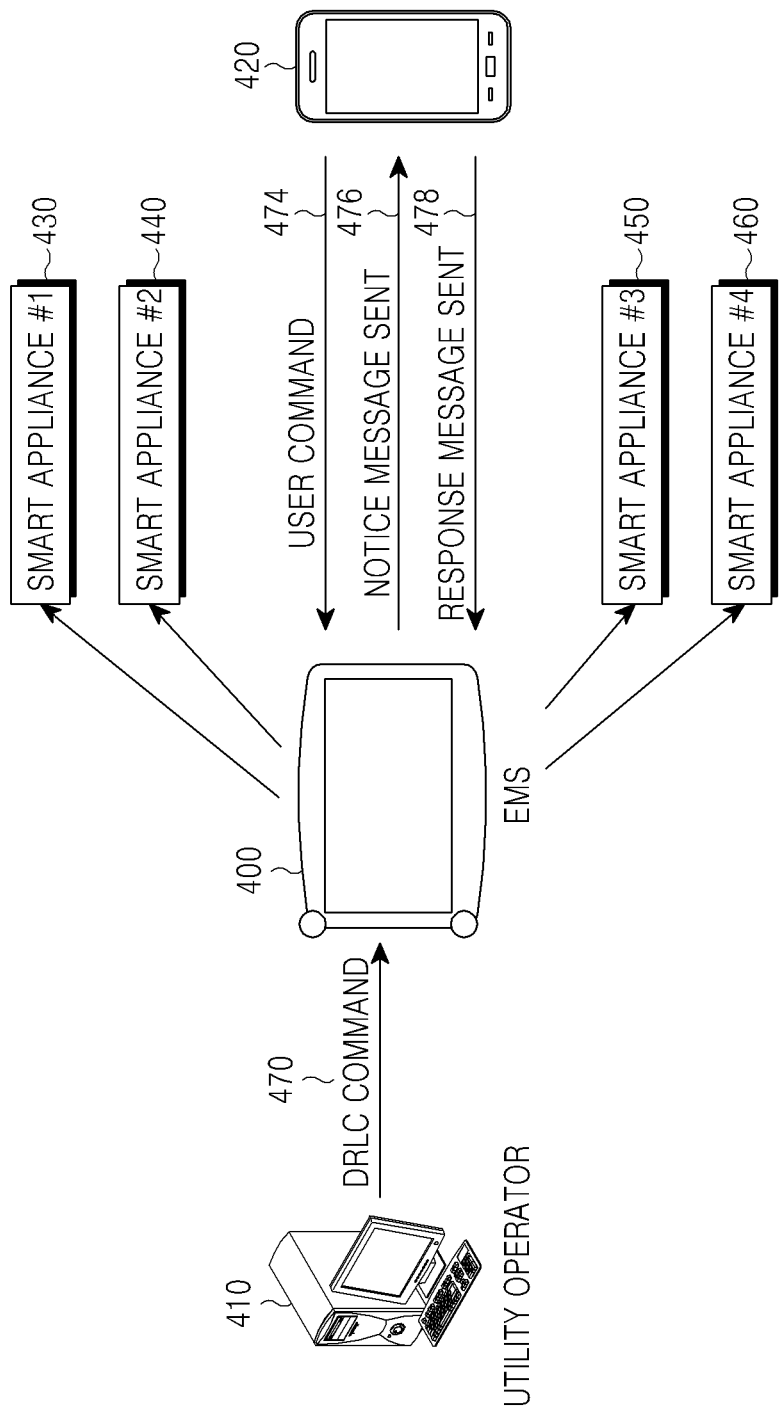
FIG. 4 is a diagram illustrating a configuration of a smart grid network for mediation between power grid management commands and user commands according to an embodiment of the present invention.

FIG. 4 is a diagram illustrating a configuration of a smart grid network for mediation between power grid management commands and user commands according to an embodiment of the present invention.

Referring to FIG. 4, an EMS 400 manages multiple home smart appliances 430, 440, 450 and 460. The EMS 400 may be connected to the smart appliances 430, 440, 450 and 460 through a power line or over the Internet, and may be provided at home. The EMS 400 receives a command for smart grid management (e.g., a DRLC command 470) from a utility operator 410 existing in the external network, and controls a target smart appliance among the multiple smart appliances based on the received DRLC command 470. The EMS 400 may forward the received DRLC command 470 to the target smart appliance, or may directly control the target smart appliance by analyzing the DRLC command 470.

The EMS 400 operates the smart appliances 430, 440, 450 and 460 according to the DRLC command 470, builds a database of the operation information, and manages the database. A smart appliance management table, which is generated by building the database of the operation information, is used to create a compromise when a conflict occurs between a DRLC command and a user command.

If a conflict between these commands occurs, the EMS 400 generates a notification-type notice message 476 including a warning indicating the occurrence of a conflict and a proposed compromise, and sends the notice message 476 to a mobile terminal 420. This notice message 476 is provided to allow the user to make a selection corresponding to the current situation. Accordingly, based upon the user's selection in response to the notice message 476, the mobile terminal 420 generates a response message 478 including information indicating whether to cancel the user command and whether the proposed compromise has been selected by the user, and sends the response message 478 to the EMS 400.

The utility operator 410 may correspond to an external operator for optimizing the energy efficiency by reducing the power consumption of smart appliances. The utility operator 410 controls power consumption of the home smart appliances 430, 440, 450 and 460 by delivering the DRLC command 470 via the EMS 400.

The smart appliances 430, 440, 450 and 460, which may be home appliances such as a washer, a refrigerator a TV, etc., operate under a control of the EMS 400 and/or the mobile terminal 420.

The mobile terminal 420 is equipped to remotely control the smart appliances 430, 440, 450 and 460. Accordingly, a user of the mobile terminal 420 may control a desired smart appliance(s) using the mobile terminal 420. A user command 474 for controlling these smart appliances may be delivered to the target smart appliance through the EMS 400, or may be directly delivered to the target smart appliance without passing through the EMS 400.

Figure 5:
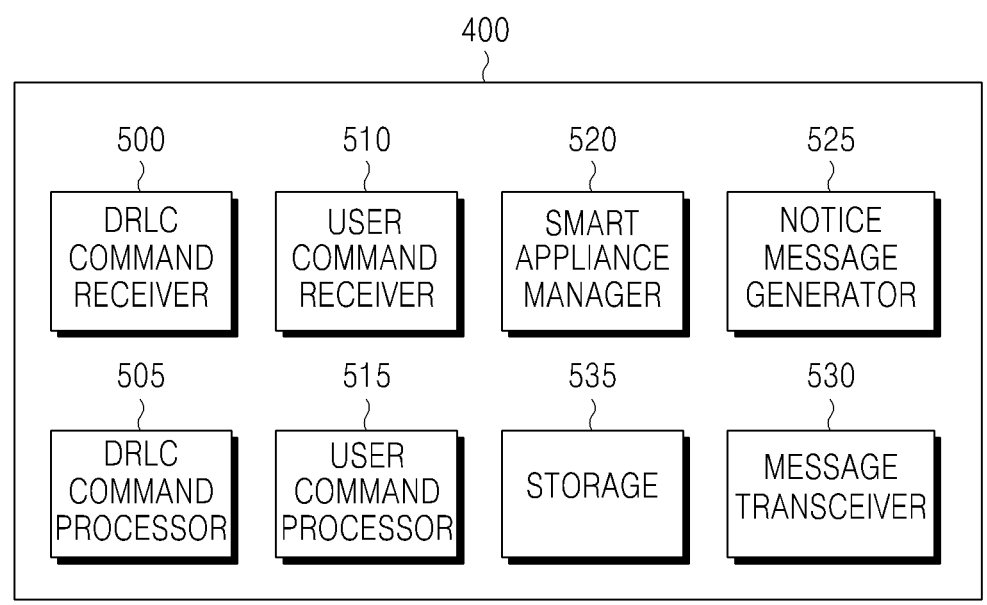
FIG. 5 is a diagram illustrating a detailed structure of the EMS in the smart grid network shown in FIG. 4.

FIG. 5 is a diagram illustrating a detailed structure of the EMS in the smart grid network shown in FIG. 4.

Referring to FIG. 5, the EMS 400 includes a DRLC command receiver 500, a DRLC command processor 505, a user command receiver 510, a user command processor 515, a smart appliance manager 520, a notice message generator 525, and a message transceiver 530. In particular, the EMS 400 further includes a storage 535 for storing a smart appliance management table.

The DRLC command receiver 500 receives a DRLC command from the utility operator 410. If the utility operator 410 is connected to the external network, the DRLC command receiver 500 may serve to connect with the utility operator 410 via the external network.

The DRLC command processor 505 processes the received DRLC command. Specifically, the DRLC command processor 505 determines at least one target smart appliance corresponding to the DRLC command among the multiple smart appliances. After determining the target smart appliance(s), the DRLC command processor 505 delivers a DRLC command-based operation command to each target smart appliance. For example, if the target smart appliance is an air conditioner, the DRLC command processor 505 may deliver an operation command for a set temperature and a scheduled time of the air conditioner. The DRLC command processor 505 forwards the received DRLC command to each target smart appliance that is capable of processing a DRLC command.

The user command receiver 510 receives a user command from the mobile terminal 420. The user command is a command issued by the user to directly control an operation of the smart appliance. The EMS 400 may remotely communicate with the mobile terminal 420. If installed at home, the EMS 400 may connect with the mobile terminal 420 via short-range communication. Although short-range communication is provided as an example, communication with the mobile terminal 420 may be achieved by other communication schemes According to embodiments of the present invention.

The user command processor 515 processes the received user command and operates in a manner similar to that of the DRLC command processor 505. Accordingly, a further detailed description of the user command processor 515 is omitted for clarity and conciseness.

The smart appliance manager 520 may manage a smart appliance based on the DRLC command or the user command. Upon receiving a DRLC command, the smart appliance manager 520 performs a control operation for reducing power consumption of the smart appliance corresponding to the DRLC command. Even though a user command is received during an operation of the smart appliance, the smart appliance manager 520 controls the operation of the smart appliance by referring to the current smart appliance management table stored in the storage 535. Accordingly, once the DRLC command is executed, the smart appliance manager 520 may stop or continue an operation of the DRLC command-based smart appliance, or may alternatively control an operation of a proposed information-based smart appliance. In either case, the smart appliance manager 520 may control a conflict between the DRLC command and the user command by referring to the smart appliance management table.

Figures 7, 8:
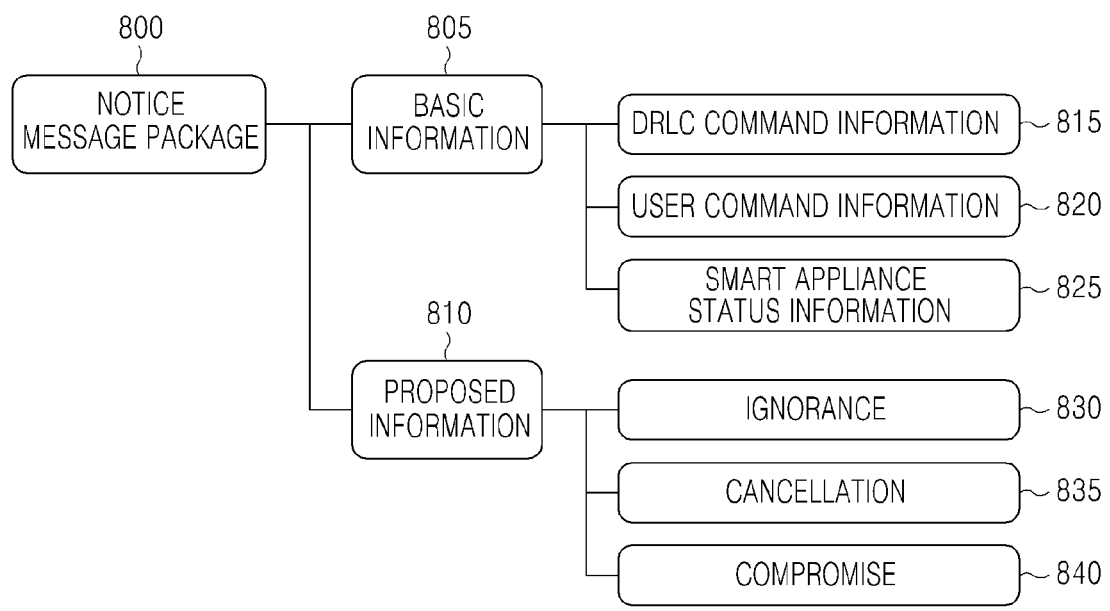
FIG. 7 is a diagram illustrating a smart appliance management table according to the embodiment of the present invention.
FIG. 8 is a diagram illustrating a structure of a notice message according to an embodiment of the present invention.

Specifically, upon receiving a user command while controlling the DRLC command-based smart appliance, the smart appliance manager 520 refers to a list of, from among the multiple smart appliances, the smart appliances being affected by the DRLC command, using the smart appliance management table, which is illustrated in FIG. 7.

Figure 6:
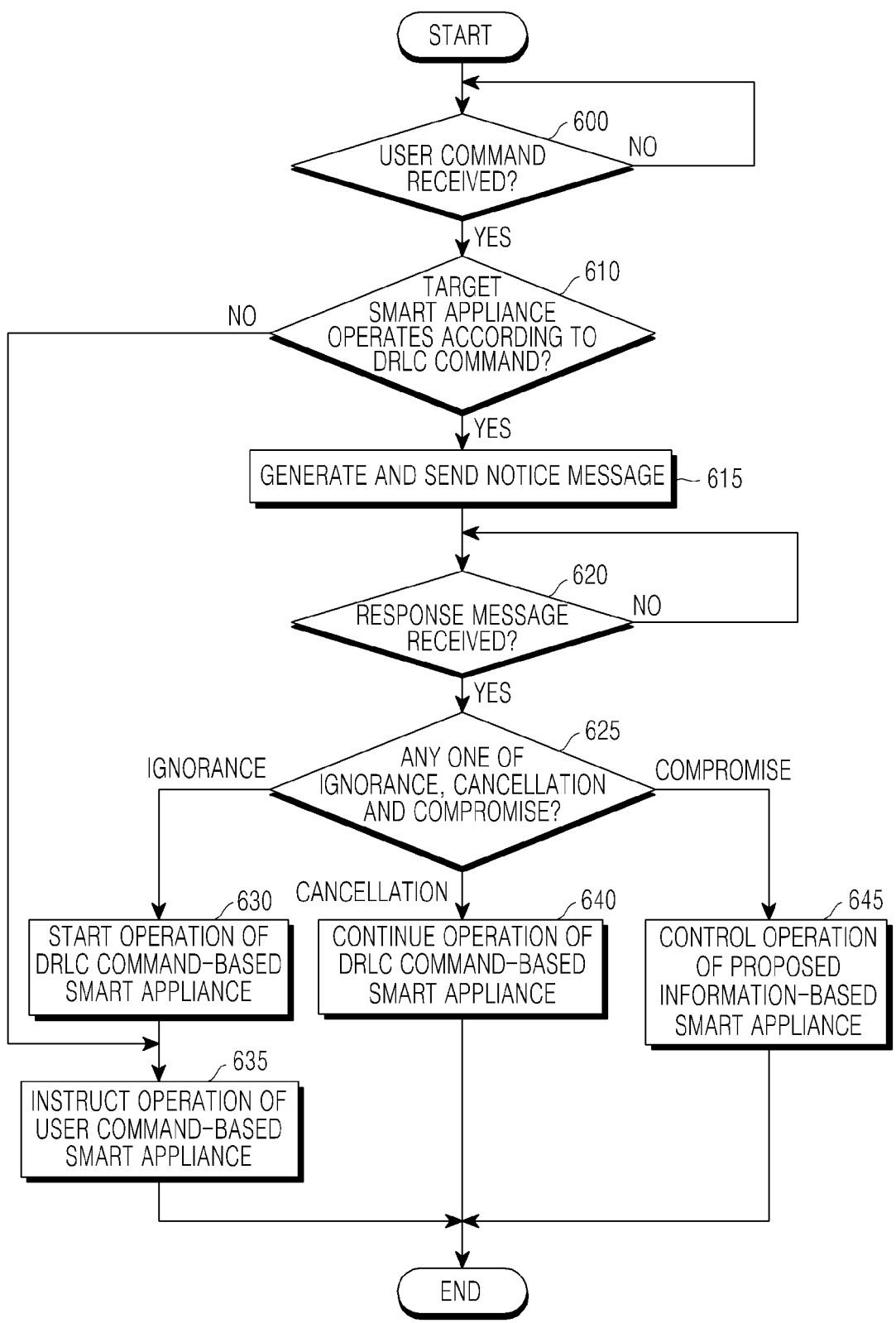
FIG. 6 is a diagram illustrating an operation of an EMS according to an embodiment of the present invention.
Figure 9:
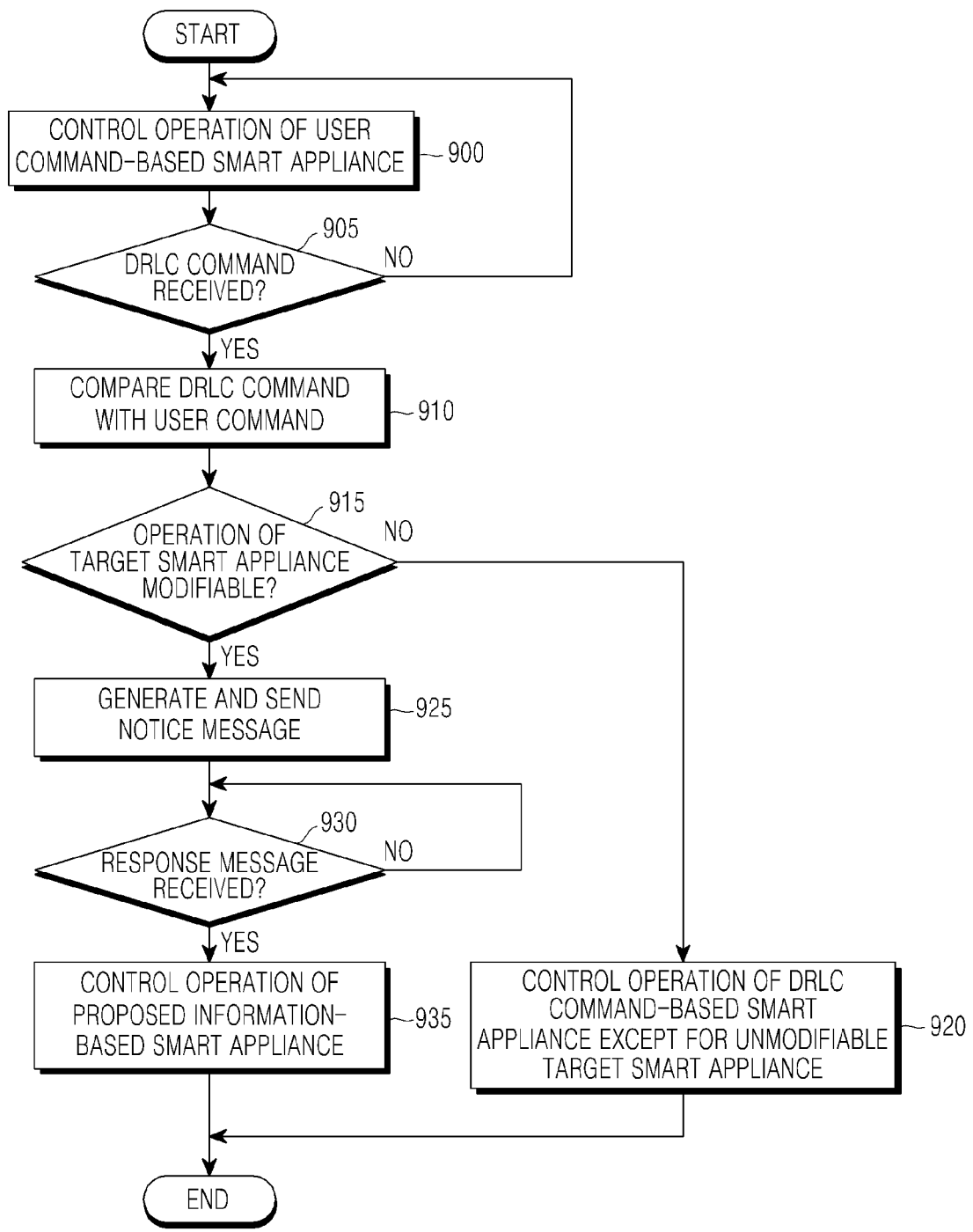
FIG. 9 is a diagram illustrating an operation of an EMS according to an embodiment of the present invention.
Figure 10:
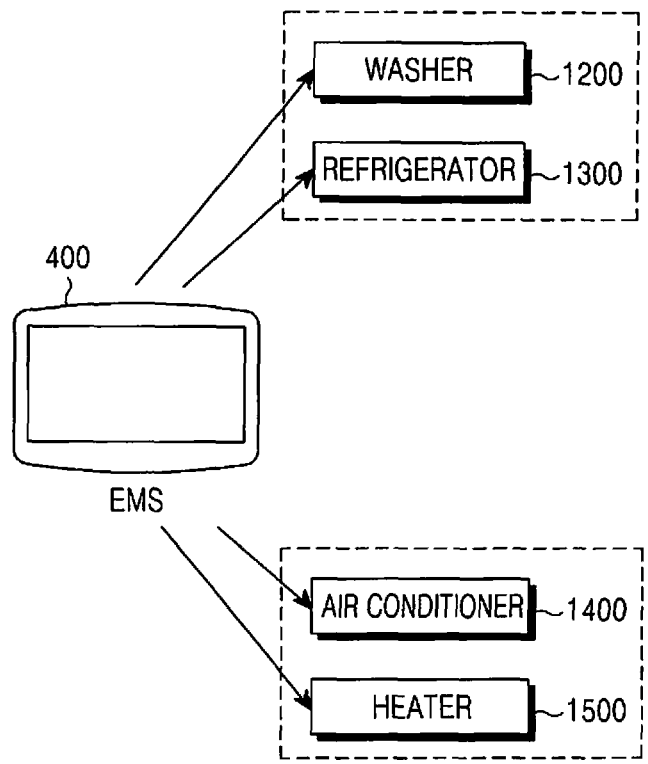
FIG. 10 is a diagram illustrating a smart appliance management table according to the embodiment of FIG. 9.

FIG. 6 is a diagram illustrating an operation of an EMS according to an embodiment of the present invention. FIG. 7 is a diagram illustrating a smart appliance management table according to the same embodiment of the present invention described with reference to FIG. 6. FIG. 9 is a diagram illustrating an operation of an EMS according to another embodiment of the present invention. FIG. 10 is a diagram illustrating a smart appliance management table according to the same embodiment of the present invention described with reference to FIG. 9.

Referring to FIG. 7, in the smart appliance management table, an indication of whether the current DRLC command is applied is mapped to each of multiple smart appliances, such as a washer, a refrigerator, an air conditioner, and a heater. Referring to the smart appliance management table in FIG. 7, the smart appliance manager 520 immediately executes the user command for the smart appliance (e.g., refrigerator) to which the DRLC command is not applied. However, for the smart appliances (e.g., washer, air conditioner, and heater) that are executing the DRLC command, the smart appliance manager 520 generates a notice message including information indicating an operating status of these smart appliances, and sends the notice message to the mobile terminal 420.

The notice message generator 525 generates a notice message when a conflict emerges between a DRLC command and a user command. The notice message may include two different characteristics according to different embodiments of the present invention. According to a first example corresponding to FIGS. 6 and 7, when a DRLC command is first being executed, the notice message sent to the mobile terminal 420 may be a kind of a warning message. According to a second example corresponding to FIGS. 9 and 10, when a user command is first being executed, the notice message may be a kind of a notification message.

The message transceiver 530 may send the generated notice message to the mobile terminal 420, and receive a response message corresponding thereto.

FIG. 8 is a diagram illustrating a structure of a notice message according to an embodiment of the present invention.

A structure of the above-described notice message sent by the message transceiver 530 is described as follows with reference to FIG. 8.

Referring to FIG. 8, a notice message package 800 according to the above-described first example according to an embodiment of the present invention is divided into basic information 805 and proposed information 810.

The basic information 805 includes DRLC command information 815 that is currently being applied to a smart appliance to which a user command is to be applied, user command information 820 for indicating a notice message corresponding to the user command, and smart appliance status information 825 of a smart appliance to which the user command is to be delivered. The user command information 820 includes identification information for identifying a response to the user command.

The proposed information 810 includes an option to ignore of the DRLC command being executed 830, an option to cancel the user command sent by the user 835, and a compromise 840 proposed by the EMS 400. The structure of the proposed information 810 may be modified according to a user's needs. The user may select any one of the elements 830, 835 and 840 of the proposed information 810 in the notice message. Therefore, the mobile terminal 420 may send a response message including the selection made by the user.

Similarly, a notice message package 800 according to the second above-described example according to an embodiment of the present invention, a smart appliance that will execute a DRLC command, and the DRLC command applied to the smart appliance are set in the DRLC command information 815; information about the current user command is set in the user command information 820; and the current status information of the smart appliance is set in the smart appliance status information 825.

In the second example of the notice message package 800 according to embodiment of the present invention, the proposed information 810 includes an option to ignore the DRLC command 830, an option to cancel the current user command 835, and a compromise 840 proposed by the EMS 400.

An operation of an EMS according to the first example according to an embodiment of the present invention is described as follows with reference to FIG. 6.

Referring to FIG. 6, upon receiving a user command in step 600, the EMS 400 determines, in step 610, whether at least one target smart appliance is operating according to a DRLC command. Since the smart grid network focuses on the optimization of the energy efficiency, unconditionally prioritizing the user command when the user command is received during an operation of the DRLC command-based smart appliance is contrary to the policy of the smart grid. By contrast, continuous execution of the DRLC command while ignoring the user command also corresponds to an operation that does not take a user's preferences into account. Therefore, for in order to select one of these two commands, the EMS 400 sends the notice message to the user, in order to provide the user with a chance to select one of the commands.

To this end, upon receiving the user command while the target smart appliance is operating according to the DRLC command, the EMS 400 instructs a target command-based smart appliance to immediately apply the received user command in step 635. The target smart appliance is a smart appliance that is not operating according to the DRLC command, referring to the smart appliance management table. However, if the target smart appliance is operating according to the DRLC command, the EMS 400 generates a warning-type notice message for the smart appliance that is executing the DRLC command, and sends the message to the mobile terminal 420, in step 615. Upon receiving a response to the warning-type notice message in step 620, the EMS 400 determines in step 625 whether a user's selection included in the response message is any one of the ignorance, cancellation, and compromise.

If the user's selection corresponds to a request to the ignore of the DRLC command being executed, the EMS 400 stops the operation of the DRLC command-based smart appliance in step 630, and then instructs the operation of the user command-based smart appliance in step 635. However, if the user's selection corresponds to the cancellation of the user command, the EMS 400 continues the operation of the DRLC command-based smart appliance in step 640. On the other hand, if the user's selection corresponds to the compromise, the EMS 400 controls the operation of the proposed information-based smart appliance in step 645.

For example, upon receiving a user command to increase the temperature while the temperature of the air conditioner is already being controlled according to a DRLC command, the EMS 400 may determine the temperature of the air conditioner in consideration of the user command, and then provide a proposal indicating the determined temperature of the air conditioner to the user. If the user requests a compromise according to this proposal, the EMS 400 may increase the temperature of the air conditioner based on the proposed information.

According to another example, upon receiving a user command to run the washer, if the low power consumption is required even though the washer is not operating according to the DRLC command, the EMS 400 may provide the user with a compromise proposal for setting a reservation to operate the washer at a time when power consumption is the least expensive, using a notice message. Through this compromise, the EMS 400 may take into account the user's position while maintaining the low power consumption.

An operation of the EMS according to the second example according to an embodiment of the present invention is described as follows with reference to FIG. 9.

Referring to FIG. 9, the EMS 400 controls an operation of the user command-based smart appliance in step 900. Upon receiving a DRLC command in step 905, the EMS 400 compares the DRLC command with the user command in step 910, and then determines in step 915 whether the operation of the target smart appliance may be modified. The EMS 400 determines whether the operation may be modified according to the smart appliance management table shown in FIG. 10. If modification of the operation of the target smart appliance is not possible, the EMS 400 controls the operation of DRLC command-based smart appliance except for un-modifiable target smart appliance in step 920. If modification of the operation of the target smart appliance is not possible, the current operation of the smart appliance that cannot be modified continues without modification. Meanwhile, operations of other devices that can be modified are controlled by the EMS 400.

For example, in the example illustrated in FIG. 10, a washer 1200 and a refrigerator 1300 are being run according to a user command. If this user command is applied, the smart appliance management table is updated taking into account the operation of the each current smart appliance. Generally, in the case of certain smart appliances, such as the washer 1200, once its operation starts, it is difficult to stop the operation (e.g., a washing operation in the washer 1200) until completion. Therefore, for the washer 1200, the possibility of modifying its DRLC command-based operation is set as 'false'.

Thereafter, upon receiving a DRLC command to control power of the washer 1200, the refrigerator 1300, an air conditioner 1400 and a heater 1500, the EMS 400 determines an inability to apply the DRLC command to the washer 1200, based on the smart appliance management table. Therefore, the refrigerator 1300, the air conditioner 1400 and the heater 1500 (i.e., smart appliances except for the washer 1200) undergo DRLC command-based control.

However, if the operation of a target smart appliance can be modified in step 915, the EMS 400 generates a notification-type notice message and sends the notice message to the user terminal 420 in step 925. Since different users might have applied different user commands to each smart appliance, even though only one mobile terminal 420 is shown in FIG. 4, the notice message may be sent to mobile terminals of different users that may modify the operations of the smart appliance.

Upon receiving a response message in step 930, the EMS 400 controls the operation of the proposed information-based smart appliance in step 935. If the notice message has been sent to different users, the EMS 400 may receive response messages from the users. As a result, according to embodiments of the present invention, despite a conflict of the DRLC command and the user command, the user may recognize the conflict and thus make his desired selection.

As is apparent from the foregoing description, according to embodiments of the present invention, it is possible to prevent a smart-grid management command or a user command having been being executed first, from being arbitrarily modified by a user command or a smart-grid management command received later one. In addition, when a conflict between the smart-grid management command and the user command occurs, embodiments the present invention may provide the user with a proposal corresponding to the current situation, thereby enabling mediation between the conflicting commands.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method of an energy management system (EMS) apparatus for managing commands in an energy management system, the method comprising:
   receiving, from a mobile terminal, a user command for at least one target smart appliance from among smart appliances controlled by the EMS apparatus;
   determining, upon receiving the user command, whether the at least one target smart appliance includes at least one power-controlled smart appliance, wherein each power-controlled smart appliance is currently being operated in a power control mode, wherein the power control mode indicates that the at least one target smart appliance is currently being operated under control of a command previously received through the EMS apparatus;
   generating, upon a determination that there is at least one power-controlled target smart appliance, a notice message for informing the mobile terminal that the at least one power-controlled target smart appliance is currently being operated in the power control mode, and sending the notice message to the mobile terminal; and
   determining, upon receiving a response message to the sent notice message, whether to continue the power control mode of the at least one power-controlled smart appliance according to selection information included in the response message.

2. The method of claim 1, wherein determining whether the at least one target smart appliance includes at least one power-controlled smart appliance includes determining whether the at least one target smart appliance operates according to a command for smart grid management.

3. The method of claim 2, wherein the command for smart grid management is received from a utility operator.

4. The method of claim 1, wherein the EMS apparatus determines whether the at least one target smart appliance includes at least one power-controlled appliance by referring to a smart appliance management table, and
   wherein the method further comprises executing the user command for any smart appliance among the at least one target smart appliance that does not operates in the power control mode.

5. The method of claim 4, wherein the smart appliance management table includes information obtained by mapping information indicating application/non-application of a command for smart grid management to each of the smart appliances controlled by the EMS apparatus.

6. The method of claim 1, wherein the notice message includes at least one of information about the at least one power-controlled smart appliance, user command information for identifying a response to the user command, operating status information of the smart appliances controlled by the EMS apparatus, an option to ignore the power control mode, an option to cancel of the user command, and a compromise proposed by the EMS apparatus.

7. The method of claim 6, wherein the response message includes at least one of a request to ignore the power control mode, a request to cancel the user command, and a request to implement the compromise proposed by the EMS apparatus, according to a user selection received by the mobile terminal.

8. The method of claim 7, wherein determining whether to continue the power control mode comprises:
   stopping, if the response message includes the request to ignore the power control mode, the operation of each target smart appliance not operating in the power control mode, and then executing the user command with respect to each target smart appliance not operating in the power control mode.

9. The method of claim 7, wherein determining whether to continue the power control mode comprises:
   maintaining, if the response message includes the request to cancel the user command, the operation of each target smart appliance not operating in the power control mode.

10. An energy management system (EMS) apparatus for managing smart appliances in an energy management system, comprising:
    a transceiver for receiving, from a mobile terminal, a user command for at least one target smart appliance among the smart appliances managed by the EMS apparatus; and
    a controller for:
    upon receiving the user command, determining whether the at least one target smart appliance includes at least one power-controlled smart appliance, such that the at least one power-controlled smart appliance is currently being operated in a power control mode, wherein the power control mode indicates that the at least one target smart appliance is currently being operated under control of a command previously received through the EMS apparatus;
    upon a determination that the at least one target smart appliance includes at least one power-controlled smart appliance, generating a notice message for informing the mobile terminal that the at least one power-controlled smart appliance is currently being operated in the power control mode;
    controlling the transceiver to transmit the notice message to the mobile terminal; and upon receiving a response message to the sent notice message, determining whether to continue the power control mode of the at least one power-controlled smart appliance according to selection information included in the response message.

11. The EMS apparatus of claim 10, wherein the smart appliance manager determines whether the at least one target smart appliance includes at least one power-controlled smart appliance according to a command for smart grid management.

12. The EMS apparatus of claim 11, wherein the command for smart grid management is received from a utility operator.

13. The EMS apparatus of claim 10, further comprising a storage for storing a smart appliance management table obtained by mapping application/non-application of a command for smart grid management to each of the smart appliances managed by the EMS apparatus.

14. The EMS apparatus of claim 13, wherein the smart appliance manager determines whether the at least one target smart appliance includes at least one power-controlled smart appliance by referring to the smart appliance management table, and executes the user command for each of the target smart appliances that does not operate in the power control mode.

15. The EMS apparatus of claim 10, wherein the notice message includes at least one of information about the at least one power-controlled smart appliance, user command information for identifying a response to the user command, operating status information of the smart appliances managed by the EMS apparatus, a request to ignore the power control mode, a request to cancel the user command, and a compromise provided by the EMS apparatus.

16. A method for providing, by a mobile terminal, commands to an energy management system (EMS) apparatus in an energy management system, the method comprising:
generating a user command for at least one target smart appliance from among smart appliances controlled by the EMS apparatus;
sending the user command to the EMS apparatus;
receiving, from the EMS apparatus, a notice message for informing the mobile terminal that the at least one target smart appliance is currently being operated in a power control mode, wherein the power control mode indicates that the at least one target smart appliance is currently being operated under control of a command previously received through the EMS apparatus;
generating a response message based on a selection of whether to continue the power control mode of the at least one target smart appliance; and
sending the response message to the EMS apparatus.

17. The method of claim 16, wherein the notice message includes at least one of information about the at least one target smart appliance, user command information for identifying a response to the user command, operating status information of smart appliances controlled by the EMS apparatus, an option to ignore the power control mode, an option to cancel the user command, and a compromise proposed by the EMS apparatus.

18. The method of claim 16, wherein the response message includes at least one of a request to ignore the power control mode, a request to cancel the user command, and a request to implement a compromise proposed by the EMS apparatus, according to the selection.

19. The method of claim 18, wherein sending the response message to the EMS apparatus comprises:
sending the response message including the request to ignore the power control mode so that the EMS apparatus stops operation of each target smart appliance not operating in the power control mode and then executes the user command with respect to each target smart appliance not operating in the power control mode.

20. The method of claim 18, wherein sending the response message to the EMS apparatus comprises:
sending the response message including the request to cancel the user command so that the EMS apparatus maintains operation of each target smart appliance not operating in the power control mode.

21. A mobile terminal for providing commands to an energy management system (EMS) apparatus in an energy management system, the mobile terminal comprising:
a controller configured to generate a user command for at least one target smart appliance from among smart appliances controlled by the EMS apparatus; and
a transceiver configured to send the user command to the EMS apparatus and receive, from the EMS apparatus, a notice message for informing the mobile terminal that the at least one target smart appliance is currently being operated in a power control mode, wherein the power control mode indicates that the at least one target smart appliance is currently being operated under control of a command previously received through the EMS apparatus,
wherein the controller generates a response message based on a selection of whether to continue the power control mode of the at least one target smart appliance and control the transceiver to send the response message to the EMS apparatus.

22. The mobile terminal of claim 21, wherein the notice message includes at least one of information about the at least one target smart appliance, user command information for identifying a response to the user command, operating status information of smart appliances controlled by the EMS apparatus, an option to ignore the power control mode, an option to cancel the user command, and a compromise proposed by the EMS apparatus.

23. The mobile terminal of claim 21, wherein the response message includes at least one of a request to ignore the power control mode, a request to cancel the user command, and a request to implement a compromise proposed by the EMS apparatus, according to the selection.

24. The mobile terminal of claim 23, wherein the controller controls the transceiver to send the response message including the request to ignore the power control mode so that the EMS apparatus stops operation of each target smart appliance not operating in the power control mode and then executes the user command with respect to each target smart appliance not operating in the power control mode.

25. The mobile terminal of claim 23, wherein the controller controls the transceiver to send the response message including the request to cancel the user command so that the EMS apparatus maintains operation of each target smart appliance not operating in the power control mode.

\* \* \* \* \*